US006728922B1

(12) United States Patent
Sundaram et al.

(10) Patent No.: US 6,728,922 B1
(45) Date of Patent: Apr. 27, 2004

(54) DYNAMIC DATA SPACE

(75) Inventors: Rajesh Sundaram, Mountain View, CA (US); Srinivvasan Viswanathan, Fremont, CA (US); Alan Rowe, San Jose, CA (US); Steven R. Kleiman, Los Altos, CA (US); John K. Edwards, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 570 days.

(21) Appl. No.: 09/642,062

(22) Filed: Aug. 18, 2000

(51) Int. Cl.$^7$ ............................................... G11C 29/00
(52) U.S. Cl. .................. 714/769; 714/763; 714/770
(58) Field of Search .................. 711/162; 707/204, 707/102; 714/763, 764, 769, 770

(56) References Cited

U.S. PATENT DOCUMENTS

| | | |
|---|---|---|
| 4,527,232 A | 7/1985 | Bechtolsheim |
| 4,742,447 A | 5/1988 | Duvall et al. |
| 4,742,450 A | 5/1988 | Duvall et al. |
| 4,761,785 A | 8/1988 | Clark et al. |
| 4,875,159 A | 10/1989 | Cary et al. |
| 4,937,763 A | 6/1990 | Mott ........................... 364/550 |
| 5,008,786 A | 4/1991 | Thatte |
| 5,043,876 A | 8/1991 | Terry |
| 5,067,099 A | 11/1991 | McCown et al. ........... 364/550 |
| 5,088,081 A | 2/1992 | Farr |
| 5,144,659 A | 9/1992 | Jones |
| 5,146,588 A | 9/1992 | Crater et al. |
| 5,155,835 A | 10/1992 | Belsan |
| 5,163,131 A | 11/1992 | Row et al. |
| 5,163,148 A | 11/1992 | Walls |
| 5,195,100 A | 3/1993 | Katz et al. |
| 5,218,695 A | 6/1993 | Noveck et al. |
| 5,218,696 A | 6/1993 | Baird et al. |

(List continued on next page.)

FOREIGN PATENT DOCUMENTS

| | | |
|---|---|---|
| EP | 0 462 917 A2 | 12/1991 |
| EP | 0 492 808 A2 | 7/1992 |
| EP | 0 497 067 A1 | 8/1992 |
| EP | 0537098 | 4/1993 |
| EP | 0 552 580 A2 | 7/1993 |
| EP | 0 569 313 A2 | 11/1993 |
| WO | WO 91/13404 A1 | 9/1991 |
| WO | WO 93/13475 A1 | 7/1993 |
| WO | WO 94/29796 A1 | 12/1994 |
| WO | WO 98/21656 A1 | 5/1998 |
| WO | WO 98/38576 A1 | 9/1998 |
| WO | WO 00/07104 A1 | 2/2000 |
| WO | WO 01/31446 A1 | 5/2001 |

OTHER PUBLICATIONS

Chia Chao et al., "Mime: a High Performance Storage Device with Strong Recovery Guarantees", Concurrent Systems Project Hewlett–Packard Laboratories, Mar. 18, 1992.
Wiebren De Jonge, "The Logical Disk: A new Approach to Improving File Systems", Dept. of Mathematics and Computer Science, Vrije Universiteit, Amsterdam.
Jim Gray et al., "Parity Striping of Disc Arrays: Low–Cost Reliable Storage with Acceptable Throughput", Proceedings of the 16$^{th}$ VLDB Conference, Brisbane, Australia 1990.
Tandem Computers Inc., 19333 Vallco Parkway, Cupertino, California. XP000522459.

(List continued on next page.)

Primary Examiner—David Ton
(74) Attorney, Agent, or Firm—Swernofsky Law Group PC

(57) ABSTRACT

A data storage system, such as RAID, upgraded dynamically including multiple stages, providing error checking data without taking the system off-line. Checksums are computed from the data and placed in block 63 of the same disk. The combination of parity bits across the parity disk, the remaining uncorrupted data in the data disks, and checksums within each disk includes sufficient information to enable restoration of corrupt data. The system is upgraded by reserving permanent checksum blocks, writing the checksums to a volume block number, and placing the checksums in permanently reserved checksum block locations after first moving data already there to unreserved blocks.

42 Claims, 3 Drawing Sheets

U.S. PATENT DOCUMENTS

| | | | |
|---|---|---|---|
| 5,222,217 A | | 6/1993 | Blount et al. |
| 5,235,601 A | | 8/1993 | Stallmo et al. |
| 5,274,799 A | | 12/1993 | Brant et al. |
| 5,274,807 A | | 12/1993 | Hoshen et al. |
| 5,297,265 A | | 3/1994 | Frank et al. |
| 5,305,326 A | | 4/1994 | Solomon et al. |
| 5,315,602 A | | 5/1994 | Noya et al. |
| 5,333,305 A | | 7/1994 | Neufeld |
| 5,335,235 A | | 8/1994 | Arnott |
| 5,357,509 A | | 10/1994 | Ohizumi |
| 5,379,417 A | | 1/1995 | Lui et al. |
| 5,490,248 A | | 2/1996 | Dan et al. |
| 5,502,836 A | | 3/1996 | Hale et al. |
| 5,649,152 A | | 7/1997 | Ohran et al. |
| 5,668,943 A | | 9/1997 | Attanasio et al. |
| 5,668,958 A | | 9/1997 | Bendert et al. |
| 5,675,726 A | | 10/1997 | Hohenstein et al. |
| 5,678,006 A | | 10/1997 | Valizadeh et al. |
| 5,737,744 A | | 4/1998 | Callison et al. |
| 5,742,752 A | | 4/1998 | DeKoning |
| 5,819,292 A | | 10/1998 | Hitz et al. |
| 5,819,310 A | | 10/1998 | Vishlitzky et al. |
| 5,828,876 A | | 10/1998 | Fish et al. |
| 5,829,046 A | * | 10/1998 | Tzelnic et al. .............. 711/162 |
| 5,835,953 A | | 11/1998 | Ohran |
| 5,907,672 A | | 5/1999 | Matze et al. |
| 5,948,110 A | | 9/1999 | Hitz et al. |
| 5,950,225 A | | 9/1999 | Kleiman |
| 5,963,962 A | | 10/1999 | Hitz et al. |
| 6,000,039 A | | 12/1999 | Tanaka et al. |
| 6,061,770 A | * | 5/2000 | Franklin .................... 711/162 |
| 6,076,148 A | | 6/2000 | Kedem |
| 6,101,585 A | | 8/2000 | Brown et al. |
| 6,119,244 A | | 9/2000 | Schoenthal et al. |
| 6,138,126 A | | 10/2000 | Hitz et al. |
| 6,397,229 B1 | * | 5/2002 | Menon et al. .............. 707/204 |
| 6,578,041 B1 | * | 6/2003 | Lomet ....................... 707/102 |

OTHER PUBLICATIONS

John H. Hartman, "The Zebra Striped Network File System", Computer Science Division, Electrical Engineering and Computer Sciences, University of California, Berkeley, California.

David Hitz, "File System Design for an NFS Server Appliance", Technical Report 3002, Presented Jan. 19, 1994. Usenix Winter 1994, San Francisco, California.

David Hitz, "An NFS File Server Appliance", Technical Report TR01, Rev. A 8/93.

IBM Technical Disclosure Bulletin, vol. 36, No. 03, Mar. 1993. XP000354845.

Steven R. Kleiman et al., "Using NUMA Interconnects for Highly Available Filers", 1999 IEEE.

Jai Menon et al., "The Architecture of a Fault–Tolerant Cached RAID Controller", IEEE Computer Society, Los Alamitos, California, May 16–19, 1993. XP000398988.

David Patterson et al., "A Case for Redundant Arrays of Inexpensive Disks (RAID)", Computer Science Division, Dept. of Electrical Engineering and Computer Sciences, University of California, Berkeley.

Slashdot, TUX 2: "The File System that Would Be King".

David Tweeten, "Hiding Mass Storage Under UNIX: Nasa's MSS–II Architecture", NAS Systems Division, NASA Ames Research Center, Moffett Filed, California, 1990 IEEEE.

* cited by examiner

DYNAMIC DATA SPACE

BACKGROUND OF THE INVENTION

1. Field of Invention

This invention relates to data storage systems.

2. Related Art

Many computer applications need to store and retrieve information. Information can be stored on hard disks, floppy disks, CD-ROMs, semiconductor RAM memory and similar storage devices. Many of these storage systems are susceptible to data loss of various forms including disk failures. A solution to the problem of disk failure involves use of a RAID (redundant array of independent disks) system. RAID systems use multiple hard drives and space to store parity data generated from the data drives, either on a separate drive (known as the parity disk) or spread out among the multiple drives. The use of multiple hard drives makes it possible to replace faulty hard drives without going off-line; data contained on a drive can be rebuilt using the other data disks and the parity data. If a hard drive fails, a new hard drive can be inserted which the system is running by "hot-swapping" while on-line. The RAID can rebuild the data on the new disk using the other data disks and the parity data. The performance of a RAID system is improved by disk striping, which interleaves bytes or groups of bytes across multiple drives, so more than one disk is reading and writing simultaneously.

Another problem with storage devices is that they are susceptible to data corruption of various forms, including bit miswrites. While RAID allows a user to determine, using parity data, that there has been corruption of some data included in a stripe, the parity data does not include enough information to restore the corrupted data. More specifically, parity data does not allow a user to determine which data in the stripe has been corrupted; thus we do not know which data is trustworthy.

Checksums are another form of redundant data that can be written to individual disks. The combination of parity bits across the disks and checksums within each disk includes enough information, that the corrupted data can be restored in RAID and other redundant systems.

A second known problem is that disk drives in earlier data detection systems are formatted in a manner incompatible with a standard checksum system. More specifically, the disk drives do not have any space available to store checksum information.

A third known problem is that the prior art of storing checksums does not provide for recovery of lost writes, including writes that did not make it to a disk drive. In such systems, updates to the data and to the checksum occur in one I/O. Recovery in such systems may be incomplete if that particular I/O becomes "lost".

Accordingly, it would be advantageous to provide an improved technique for the error checking and correction of data storage systems. This is achieved in an embodiment of the invention that is not subject to the drawbacks of the related art.

SUMMARY OF THE INVENTION

The invention provides an improved method and apparatus for a data storage system to be upgraded dynamically including multiple stages to provide redundant data for error checking without needing to take the system off-line.

In a first aspect of the invention, the data storage system is a RAID system composed of multiple hard disk drives and a controller for the drives. Additional redundant data (including data known as checksums) need to be stored on a formatted system that is in use (e.g. "on-line"). In a preferred embodiment including a set of consecutive blocks on the same disk, numbers 0–63, checksums are computed from the data in blocks 0–62 and placed in block 63. Similar to parity bits, checksums do not provide adequate information on their own because they are limited to detecting errors. The combination of (1) parity bits across the RAID system stored on the parity disk, (2) the remaining uncorrupted data in the data disks and (3) checksums within each disk includes sufficient information so as to enable restoration of corrupt data in RAID systems and other similar devices.

In a second aspect of the invention, a data storage system can be upgraded by following a step-wise procedure that involves reserving permanent checksum blocks and writing the checksums to the checksum blocks. The checksums are placed in permanently reserved checksum block locations after first moving data already in the reserved blocks to unoccupied and unreserved data storage blocks.

In a third aspect of the invention, the checksum block includes a collection of checksums. In a preferred embodiment, this checksum block is one of a set of 64 blocks (0–63) that form a megablock. There are 63 data blocks and 1 checksum block in a megablock. The checksums come in the following form: block checksums (8 byte ID and 4 Adler bytes from the location and data of the block 4K bytes) and checksum blocks (a collection of 64 of these block checksums). The $64^{th}$ block checksum in the checksum block checks the checksum block itself. In other embodiments, other formats of data and algorithms other than Adler's can be used.

In a fourth aspect of the invention, new data is written to data blocks in the previously upgraded system. New checksums are computed and written to new checksum blocks that are separate from the data blocks. Corrupted data can be identified on a particular disk drive in a RAID and other redundant data storage systems and restored using the other data disks and the parity disk while the system is on-line.

In a fifth aspect of the invention, data and checksums are stored in separate blocks. Two separate I/Os are performed (one I/O to updated the data and the second to updated the checksum). This separation allows recovery of information if data fails to be written to a disk or is otherwise "lost".

In a preferred embodiment, the invention is operative on a RAID system for a file server. However, in other embodiments, the invention is applicable to any computer data storage system such as a database system or a store and forward system such as cache or RAM.

DETAILED DESCRIPTION OF THE PREFERRED EMBODIMENT

Incorporated Disclosures

Figure 1:
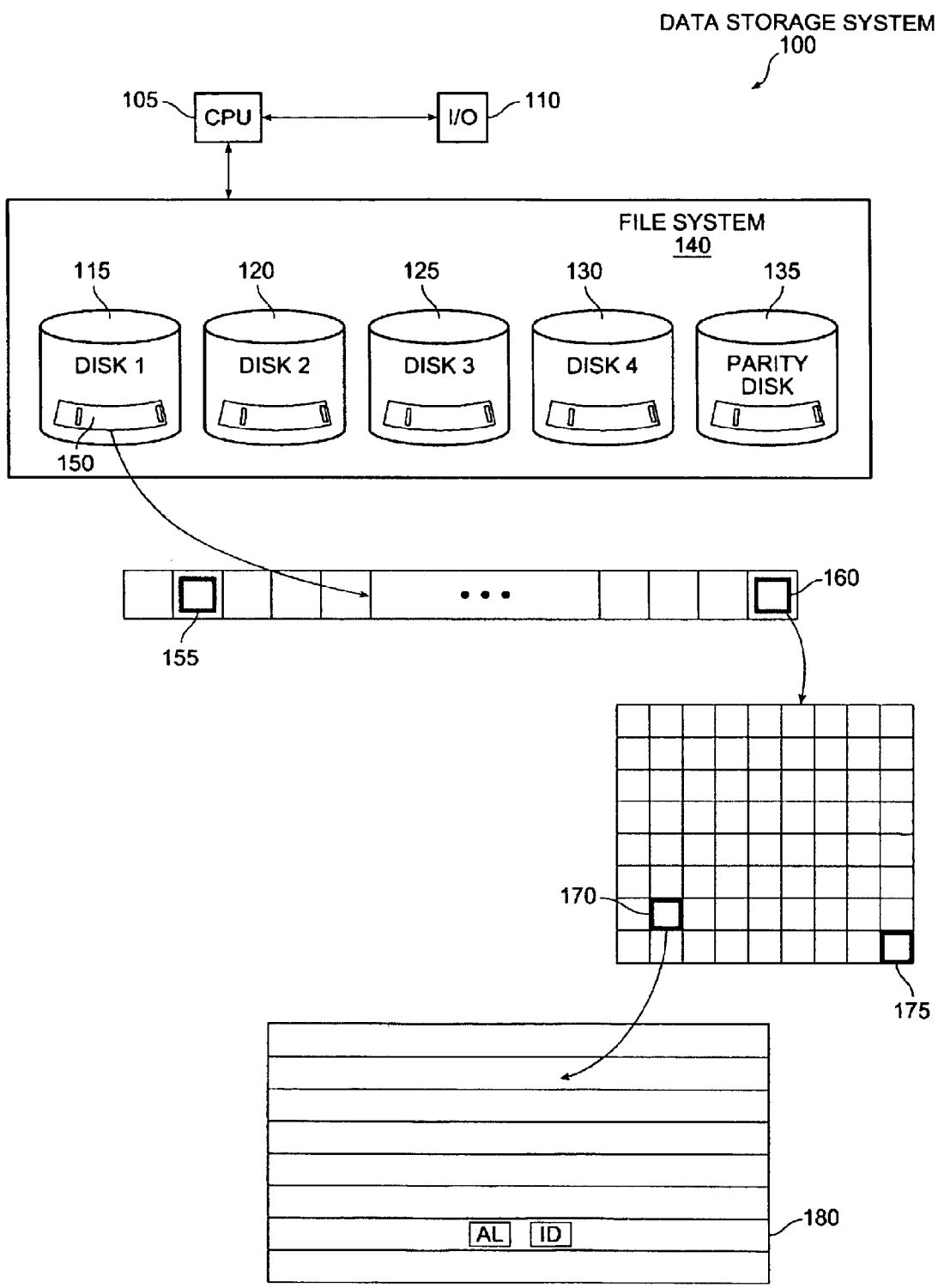
FIG. 1 shows a block diagram of a reliable, redundant data storage system.

The inventions described herein can be used in conjunction with inventions described in the following applications:

application Ser. No. 09/642,063, in the names of Blake LEWIS, Express Mailing Number EL524781089US, titled "Reserving File System Blocks", assigned to the same assignee, and all pending cases claiming the priority thereof.

application Ser. No. 09/642,066, in the names of Ray CHEN, Express Mailing Number EL524780256US, titled "Manipulation of Zombie Files and Evil-Twin Files", assigned to the same assignee, and all pending cases claiming the priority thereof.

application Ser. No. 09/642,065, in the names of Doug DOUCETTE, Express Mailing Number EL524781092US, titled "Improved Space Allocation in a Write Anywhere File System", assigned to the same assignee, and all pending cases claiming the priority thereof.

application Ser. No. 09/642,061, in the names of Blake LEWIS, Express Mailing Number EL524780239US, titled "Instant Snapshot", assigned to the same assignee, and all pending cases claiming the priority thereof.

application Ser. No. 09/642,064, in the names of Scott SCHOENTHAL, Express Mailing Number EL524781075US, titled "Persistent and Reliable Delivery of Event Messages", assigned to the same assignee, and all pending cases claiming the priority thereof.

Lexicography

As used herein, use of the following terms refer or relate to aspects of the invention as described below. The general meaning of these terms is intended to be illustory and in no way limiting.

Byte—In general, the term "byte" refers to a group of 8 bits organized as a word.

Parity checking—In general, the term "parity checking" refers to an error detection technique that tests the integrity of digital data within a computer system or over a network. While checking parity, the parity bits are compared against computed values of parity, which are the exclusive OR of the sets of data bits.

Parity disk—In general, the term "parity disk" refers to a separate disk drive that holds parity bits in a disk array, such as four data disks and one parity disk in a volume of a data storage system.

Checksum—In general, the term "checksum" refers to a value used to ensure data is stored or transmitted without error. This value is created by calculating the binary values in a block of data using some algorithm and storing the results with the data or at a separate location. When the data is retrieved from memory, received at the other end of a network or retrieved from a computer storage system, a new checksum is computed and matched against the existing checksum. A non-match indicates an error.

Sector—In general, the term "sector" refers to a physical section of a disk drive including a collection of bytes, such as 512 bytes.

Block—In general, the term "block" refers to a group of sectors, such as 8 sectors or 4,096 bytes, commonly called 4 K bytes.

Checksum block—In general, the term "checksum block" refers to a collection of checksums, such as 64 checksums. The $64^{th}$ checksum verifies the checksum block itself.

VBN (Volume Block Number)—In general, the term "VBN" refers to an integer which maps to a disk number and disk block number.

DBN (Disk Block Number)—In general, the term "DBN" refers to the location of a particular block on a disk in a volume of the file system.

Stripe—In general, the term "stripe" refers to the collection of blocks in a volume with the same DBN on each disk.

Megablock—In general, the term "megablock" refers to a group of blocks, such as 64 blocks including 63 data blocks and 1 checksum block.

Volume—In general, the term "volume" refers to a single file system spread across multiple disks and associated disk drives. Known data storage systems have current size limits, such as greater than one terabyte and are included in multiple volumes, such as 23 volumes fsinfo (File System Information Block)—In general, the term "fsinfo" refers to one or more copies of an "fsinfo block" located at fixed locations on the disks. The fsinfo block includes information about the volume, such as volume size, volume levels, options, language, transactions and other aspects thereof.

RAID (redundant array of independent disks)—In general, the term "RAID" refers to a disk subsystem that provides increased performance and/or fault tolerance. A RAID system comprises a RAID controller and a collection of regular disk drives.

RAID LEVEL 4—In general, the term "RAID level 4" refers to a widely-used version of RAID. Data is striped across a group of disk drives for performance, such as three or more drives. Parity bits are used for fault tolerance. The parity bits computed from the data bits are stored on a separate parity drive.

WAFL (Write Anywhere File Layout)—In general, a high level structure for a file system that is above RAID in hierarchy and including metadata, such as one or more copies of "fsinfo block" (file system information block) located at fixed locations on disk. Pointers are used for locating the remaining data. All the data except the fsinfo blocks are collected into files and these files can be written anywhere on the disk.

Parity protected—In general, the term "parity protected" refers to protection of a collection of data using parity bits. Data is parity protected if it has a parity for entire collection of data. In a preferred embodiment, parity computations can be made across bytes.

Checksum blocks layout—In general, the term "checksum blocks layout" refers to a collection of checksum blocks interleaved between data blocks to maintain checksum information. A stripe is comprised entirely of checksum blocks or data blocks. The layout is the same throughout each disk and on all the disks in the data storage system.

Consistency point (CP)—In general, the term "CP" refers to a time after all the files have been written to all the blocks and are safely on disk including writing the fsinfo block out sequentially. If the system crashes before fsinfo block goes out, all changes made after the last CP are lost and the system reverts back to the last CP. The file system advances atomically from one consistent state to the next.

Consistent state—In general, the term "consistent state" refers to a file system configuration of files in blocks after the CP is reached.

Write allocation—In general, the term "write allocation" refers to a file manager command to always copy to new blocks when writing data. The file system may pick a new block "anywhere" convenient, but must never overwrite existing data. The file system saves a relatively large amount of data to write out until the write allocation command.

Dynamically—Refers to operations performed "on the fly," which are based on decisions made while the program is running rather than beforehand. For example, the expression, "buffers are dynamically created," means that space is created when actually needed, not reserved ahead of time.

As described herein, the scope and spirit of the invention is not limited to any of the definitions or specific examples shown therein, but is intended to include the most general concepts embodied by these and other terms.

System Elements

FIG. 1 shows a block diagram of a reliable, redundant data storage system.

A data storage system 100 includes a controller CPU (central processing unit) 105, an I/O port 110, a plurality of RAID disk drives, including drive 115, drive 120, drive 125, drive 130 and parity drive 135, and a file system 140. The I/O port 110 is connected to a larger computer system in such a way that that controller CPU 105 can send and data from the I/O port 110. The data is written to and read from the set of RAID disk drives in a file system 140.

Unlike other systems may require breaking up the bytes in a block of data or breaking up the block of data itself, each bit in the parity block is computed using the corresponding bits in the data blocks. Thus, if there are four blocks of data, one block would be put on a first drive 115, the second block would be put on drive 120, the third block would be put on drive 125 and the fourth block on drive 130. The parity block is computed using an XOR of the data blocks.

In a preferred embodiment, the five disk drives 115, 120, 125, 130 and 135 in a RAID system include one or more volumes. A volume is a single file system in a data storage system. Each disk includes a collection of megablocks. Disk 1 115 includes a megablock 150. The megablock 150 in disk 1 115 has 64 blocks including 63 data blocks and one checksum block 160. Each block has a unique VBN (volume block number) and DBN (disc block number). The blocks are numbered from 0 to 63. Blocks 0 to 62 are data blocks and the 64th block 160 is the checksum block.

A checksum block 160 includes 64 checksums. In a preferred embodiment, each in a checksum block 170 is a checksum for it's entire associated 4K block, consisting of a 4 byte adler checksum and a 4 byte logical DBN of the block and a 8 byte VBN of the block. Other embodiments may use other formats of data and algorithms other than Adler's. Checksum blocks are permanently reserved in the data storage system. Checksum blocks are interleaved between data blocks to maintain the checksum information. This interleaving causes the datablock and the checksum block to reside in close proximity to each other. This enhances performance because when one block is read, the other block is nearby ready to be read. A stripe of blocks will either contain data blocks or checksum blocks, never a mixture. The locations of the checksum are the same on each disk. Henceforth a stripe of checksum blocks is referred to as "checksum stripe".

Method of Use

Figure 2:
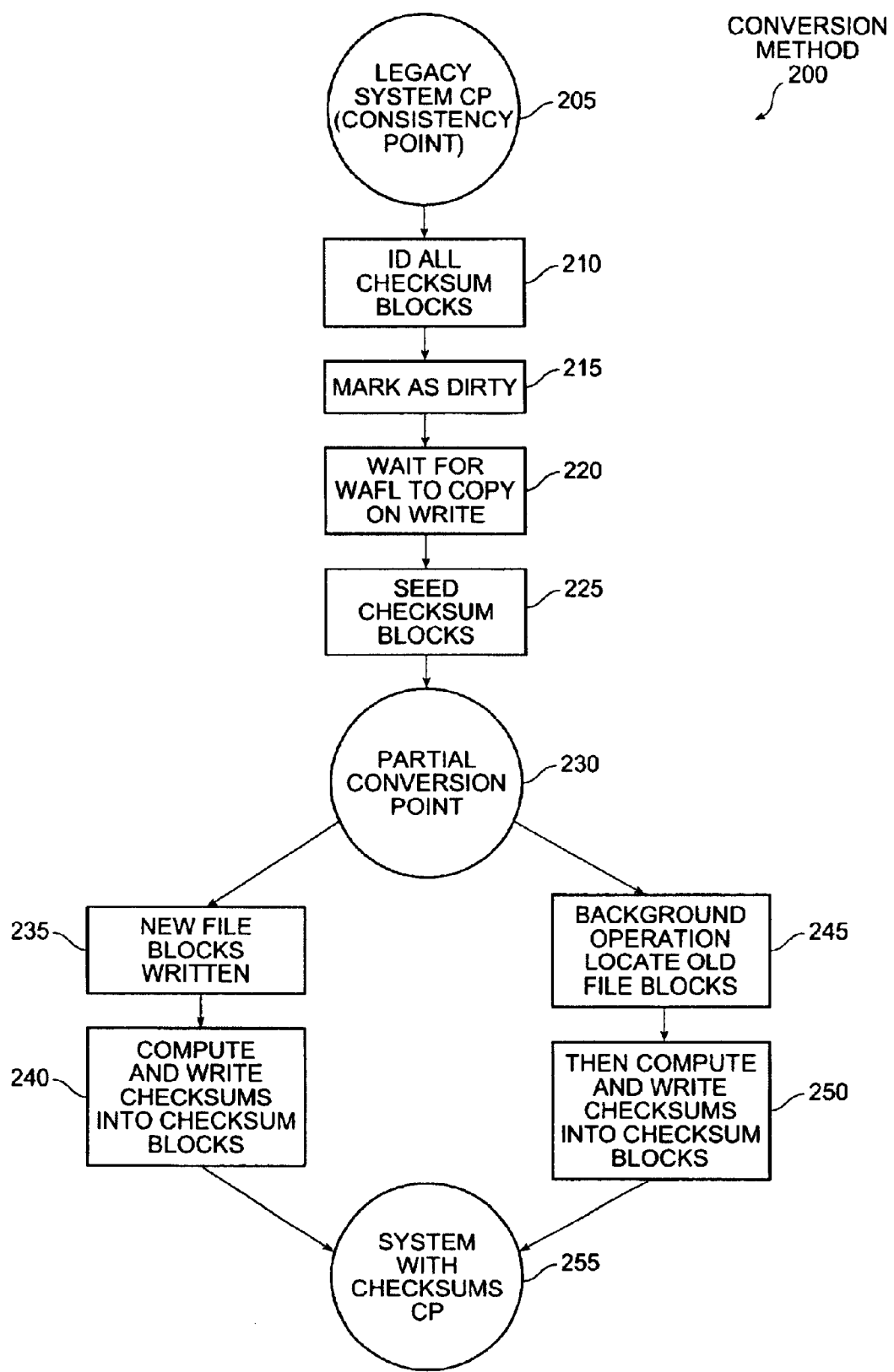
FIG. 2 shows a flow diagram of a method for converting a reliable, redundant data storage system to include checksums.

FIG. 2 shows a flow diagram of a method for converting a reliable, redundant data storage system to include checksums.

A conversion method 200 is performed by the data storage system 100. Although the conversion method 200 is described serially, the steps of the conversion method 200 can be performed by separate elements in conjunction or in parallel, whether asynchronously, in a pipelined manner, or otherwise. There is no particular requirement that the conversion method 200 be performed in the same order in which this description lists the steps, except where so indicated.

At a flow point 205, the data storage system 100 is at a consistent state of a legacy system and ready to perform a conversion method 200 to the data storage system including checksums. The conversion method 200 does not require reformatting hard disks or taking the data storage system off-line.

At a step 210, the data storage system 100 identifies all the checksum blocks in the volume, known as the checksum stripes.

At a step 215, the data storage system 100 marks the checksum blocks as dirty.

At a step 220, the data storage system 100 notifies any users to stop using the marked blocks and to move any data currently in those blocks to a different location.

In a preferred embodiment, the data storage system 100 waits for any users, (such as WAFL) to copy-on-write at the next write allocation. Upon receiving the copy-on-write command, data blocks marked as dirty are copied from the checksum blocks to available blocks.

At a step 225, the data storage system 100 seeds the checksum blocks with new data that identifies the checksum blocks as ready to accept checksums.

At a flow point 230, the data storage system 100 reaches a partial conversion point. The data storage system 100 has moved all the data in the identified checksum blocks to available data blocks and is ready to write checksums to the checksum blocks.

At step point 235, the data storage system 100 writes new file blocks to unallocated data storage blocks.

At a step point 240, the data storage system 100 computes the checksums for the new file blocks and writes the checksums into the associated checksum blocks.

At a step 245, the data storage system 100 operates in the background to locate old file blocks of the legacy system. These blocks do not have checksums.

At a step 250, the data storage system 100 computes the checksums for the old file blocks of the legacy system. The checksums are written to their associated checksum blocks.

At a step 255, the data storage system 100 reaches a new consistent state including checksum error detection. At the completion of writing all the blocks (including the data blocks, checksum blocks and fsinfo blocks) to all the VBNs, the file system advances atomically from one consistent state, the legacy system to the system with checksums. WAFL does not overwrite the blocks freed from one CP to the next CP.

It should be noted that once the system 100 has reached a new consistent state including checksum error detection, additional writes (step 235) will trigger computation and writes of checksums into checksum blocks (step 240). This activity leads to a new consistent state.

In the event of a crash, NVRAM keeps track of which blocks may have invalid checksums. This is analogous to the use of NVRAM to keep track of which stripes may have a bad parity after a reboot.

Figure 3:
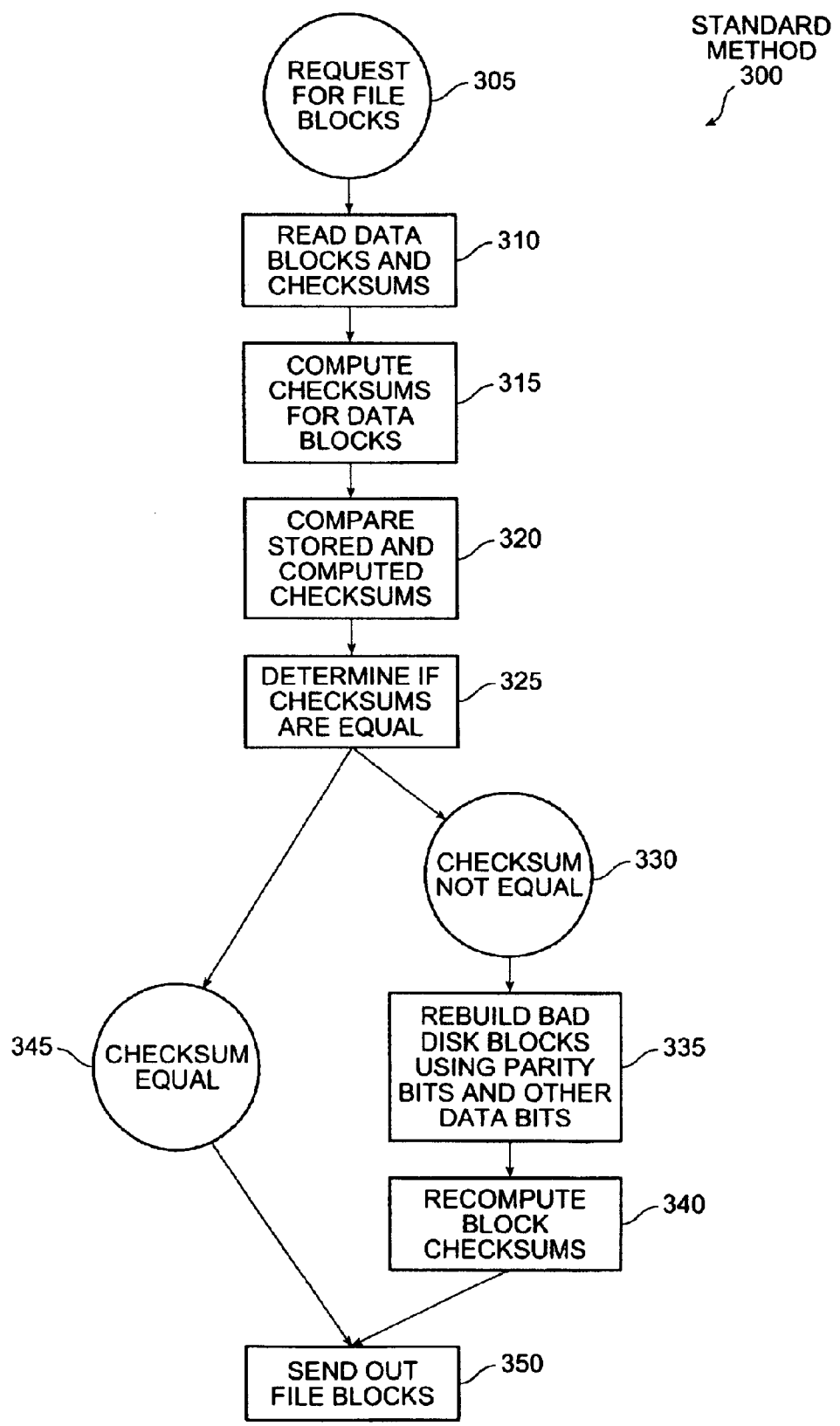
FIG. 3 shows a flow diagram of a method using checksums in a reliable, redundant data storage system

FIG. 3 shows a flow diagram of a method using checksums in a reliable, redundant data storage system.

A standard method 300 is performed by the data storage system 100. Although the standard method 300 is described serially, the steps of the standard method 300 can be performed by separate elements in conjunction or in parallel, whether asynchronously, in a pipelined manner, or otherwise. There is no particular requirement that the standard method 300 be performed in the same order in which this description lists the steps, except where so indicated.

At a flow point 305, the data storage system 100 is at a consistent state including checksum error detection. The data storage system 100 is ready for requests to read file blocks from a volume.

At a step 310, the data storage system 100 reads one or more data blocks. The block checksums are also read from a separate location in the volume.

At a step 315, the data storage system 100 computes the checksums of the data blocks.

At a step 320, the data storage system 100 compares the stored and computed checksums.

At a step 325, the data storage system 100 determines whether the stored and computed checksums are equal.

At a flow point 330, the data storage system 100 identifies unequal checksums and is ready to correct the data error detected by the system.

At a branch flow point 335, the data storage system 100 rebuilds one or more disk blocks using parity bits and other data bits.

At a branch flow point 340, the data storage system 100 recomputes the block checksums for all the rebuilt disk blocks. The new block checksums are written to checksum blocks.

At a branch flow point 345, the data storage system 100 identifies equal checksums and is ready to send out the requested file blocks.

At a branch flow point 350, the data storage system 100 outputs the requested file blocks.

It should be noted that data and checksums are stored in separate blocks. Two separate I/Os are performed (one I/O to updated the data and the second to updated the checksum). This separation allows recovery of information if data fails to be written to a disk or is otherwise "lost".

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method for updating a mass storage system using data error checking and correction including
   allocating a plurality of storage blocks to files in a file system;
   determining a first subset of said storage blocks in which to record error code information and a second subset of said storage blocks in which to record data;
   marking a storage block of said first subset, whereby said file system copies data from said marked storage block to a storage block in said second subset; and
   whereby said first subset of said storage blocks are reserved for use by said file system for recording said error code information.

2. A method as in claim 1, including
   waiting for said file system to free at least one storage block in said first subset; and
   recording error code information in said at least one storage block in said first subset.

3. A method as in claim 1, including
   associating a group of storage blocks with each one of said first subset of storage blocks;
   determining error code information with regard to said group of storage blocks; and
   recording said error code information in said associated storage block in said first subset.

4. A method as in claim 3, including
   performing said determination of error code information in response to recording data in at least one of said group of associated storage blocks.

5. A method as in claim 3, including performing said determination of error code information in response to a time duration during which no new data is recorded in said group of associated storage blocks.

6. A method as in claim 1, wherein said updating can be performed with said file system on-line.

7. A method as in claim 1, wherein said updating can be performed while retaining legacy data included in said dynamic storage system.

8. A method as in claim 7, wherein said legacy data is formatted with sectors of 512 bytes.

9. A method for a dynamic data storage system including
   upgrading said dynamic storage system on the fly with multiple stages to provide redundant data for error checking with the system able to remain on-line;
   retaining legacy data included in said dynamic storage system;
   associating a collection of parity bits and a collection of checksums;
   identifying corrupted data; and
   restoring said corrupted data.

10. A method as in claim 9 wherein said parity bits are distributed in one or more storage device.

11. A method as in claim 10, wherein said storage device is a disk drive.

12. A method as in claim 9, wherein said checksums are included in an associated disk drive.

13. A method for upgrading a dynamic storage system on the fly with multiple stages to provide redundant data for error checking with the system able to remain on-line including
   retaining legacy data included in said dynamic storage system;
   allocating a plurality of storage blocks to files in a file system;
   determining a first subset of said storage blocks in which to record error code information and a second subset of said storage blocks in which to record data;
   marking a storage block of said first subset, whereby said file system copies data from said marked storage block to a storage block in said second subset; and
   recording error code information in said at least one storage block in said first subset.

14. A method as in claim 13 including
   associating a group of storage blocks with each one of said first subset of storage blocks;
   determining error code information with regard to said group of storage blocks; and
   recording said error code information in said associated one storage blocks in said first subset.

15. An apparatus comprising a mass storage system updated using data error checking and correction including
   a plurality of storage blocks allocated to files in a file system;
   a first subset of said storage blocks selected to record error code information and a second subset of said storage blocks in which to record data;
   a storage block of said first subset marked for copying data from said marked storage block to a storage block in said second subset; and
   whereby said first subset of said storage blocks are reserved for use by said file system for recording said error code information.

16. An apparatus as in claim 15, wherein
   said file system waits to free at least one storage block in said first subset; and
   error code information is recorded in said at least one storage block in said first subset.

17. An apparatus as in claim 15, including
   a group of storage blocks associated with each one of said first subset of storage blocks; and
   error code information determined with regard to said group of storage blocks, with said error code information recorded in said associated one storage blocks in said first subset.

18. An apparatus as in claim 17, wherein said error code information is determined in response to recording data in at least one of said group of associated storage blocks.

19. An apparatus as in claim 17, wherein said error code information is determined in response to a time duration during which no new data is recorded in said group of associated storage blocks.

20. An apparatus as in claim 15, wherein said updating can be performed with said file system on-line.

21. An apparatus as in claim 15, wherein said updating is performed while retaining legacy data included in said dynamic storage system.

22. An apparatus as in claim 15, wherein said legacy data is formatted with sectors of 512 bytes.

23. An apparatus comprising a dynamic data storage system including
   redundant data for error checking, with said dynamic storage system upgraded on the fly with multiple stages to provide said redundant data for error checking with the system able to remain on-line;
   legacy data retained in said dynamic storage system; and
   an associated a collection of parity bits and a collection of checksums;
   wherein corrupted data is identified and restored.

24. An apparatus as in claim 23 wherein said parity bits are distributed in one or more storage devices.

25. An apparatus as in claim 24, wherein said storage device is a disk drive.

26. An apparatus as in claim 23, wherein said checksums are included in an associated disk drive.

27. An apparatus comprising a dynamic storage system that can be upgraded on the fly with multiple stages to provide redundant data for error checking with the system able to remain on-line including
   legacy data is retained in said dynamic storage system; and
   a plurality of storage blocks allocated to files in a file system;
   wherein a first subset of said storage blocks are selected in which to record error code information and a second subset of said storage blocks in which to record data;
   wherein a storage block of said first subset are marked, whereby said file system copies data from said marked storage block to a storage block in said second subset; and
   wherein error code information is recorded in said at least one storage block in said first subset.

28. An apparatus as in claim 27 including
   a group of storage blocks associated with each one of said first subset of storage blocks;
   wherein error code information is determined with regard to said group of storage blocks; and
   wherein said error code information is recorded in said associated storage blocks in said first subset.

29. An apparatus for updating a mass storage system using data error checking and correction including
   a means for allocating a plurality of storage blocks to files in a file system;
   a means for determining a first subset of said storage blocks in which to record error code information and a second subset of said storage blocks in which to record data;
   a means for marking a storage block of said first subset, whereby said file system copies data from said marked storage block to a storage block in said second subset; and
   whereby said first subset of said storage blocks are reserved for use by said file system for recording said error code information.

30. An apparatus as in claim 29, including
   a means for waiting for said file system to free at least one storage block in said first subset; and
   a means for recording error code information in said at least one storage block in said first subset.

31. An apparatus as in claim 29, including
   a means for associating a group of storage blocks with each one of said first subset of storage blocks,
   a means for determining error code information with regard to said group of storage blocks; and
   a means for recording said error code information in said associated storage block in said first subset.

32. An apparatus as in claim 31, including
   a means for performing said determination of error code information in response to recording data in at least one of said group of associated storage blocks.

33. An apparatus as in claim 31, including a means for performing said determination of error code information in response to a time duration during which no new data is recorded in said group of associated storage blocks.

34. An apparatus as in claim 29, wherein said a means for updating can be performed with said file system on-line.

35. An apparatus as in claim 29, wherein said a means for updating can be performed while retaining legacy data included in said dynamic storage.

36. An apparatus as in claim 35, wherein said legacy data is formatted with sectors of 512 bytes.

37. An apparatus for a dynamic data storage system including
   a means for upgrading said dynamic storage system on the fly with multiple stages to provide redundant data for error checking with the system able to remain on-line;
   a means for retaining legacy data included in said dynamic storage system;
   a means for associating a collection of parity bits and a collection of checksums;
   a means for identifying corrupted data; and
   a means for restoring said corrupted data.

38. An apparatus as in claim 37, wherein said parity bits are distributed in one or more storage devices.

39. An apparatus as in claim 38, wherein said storage device is a disk drive.

40. An apparatus as in claim 37, wherein said checksums are included in an associated disk drive.

41. An apparatus for upgrading a dynamic storage system on the fly with multiple stages to provide redundant data for error checking with the system able to remain on-line including
   a means for retaining legacy data included in said dynamic storage system;
   a means for allocating a plurality of storage blocks to files in a file system;
   a means for determining a first subset of said storage blocks in which to record error code information and a second subset of said storage blocks in which to record data;
   a means for marking a storage block of said first subset, whereby said file system copies data from said marked storage block to a storage block in said second subset; and
   a means for recording error code information in said at least one storage block in said first subset.

42. A apparatus as in claim 41 including
   a means for associating a group of storage blocks with each one of said first subset of storage blocks;
   a means for determining error code information with regard to said group of storage blocks; and
   a for recording said error code information in said associated one storage blocks in said first subset.

* * * * *